US008098880B2

(12) United States Patent
Wang

(10) Patent No.: US 8,098,880 B2
(45) Date of Patent: Jan. 17, 2012

(54) SYSTEM AND METHOD FOR THE GENERATION OF MULTI-LAYER CORRELATION-BASED DIGITAL WATERMARKS

(75) Inventor: Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1087 days.

(21) Appl. No.: 11/897,826

(22) Filed: Aug. 31, 2007

(65) Prior Publication Data

US 2009/0060262 A1  Mar. 5, 2009

(51) Int. Cl.
*G06K 9/00* (2006.01)
*H04N 1/40* (2006.01)

(52) U.S. Cl. ........................................ 382/100; 358/3.28
(58) Field of Classification Search .................. 382/100, 382/232, 240; 380/51, 54, 201, 210, 252, 380/287; 713/176, 179; 358/3.28; 370/522–529; 283/72, 74–81, 85, 93, 901; 348/461, 463
See application file for complete search history.

(56) References Cited

U.S. PATENT DOCUMENTS

| | | | |
|---|---|---|---|
| 4,149,183 A | | 4/1979 | Pellar et al. |
| 4,196,451 A | | 4/1980 | Pellar |
| 5,537,223 A | * | 7/1996 | Curry ............................ 358/3.28 |
| 6,252,971 B1 | * | 6/2001 | Wang ............................ 382/100 |
| 6,614,914 B1 | * | 9/2003 | Rhoads et al. ................ 382/100 |
| 6,798,539 B1 | | 9/2004 | Wang et al. |
| 6,885,757 B2 | * | 4/2005 | Bloom et al. ................. 382/100 |
| 7,215,444 B2 | * | 5/2007 | Hains ........................... 358/3.09 |
| 7,352,879 B2 | * | 4/2008 | Wang ............................ 382/100 |
| 7,894,626 B2 | | 2/2011 | Wang et al. |
| 2004/0052401 A1 | | 3/2004 | Suzaki |
| 2006/0120557 A1 | | 6/2006 | Wang |
| 2008/0019559 A1 | | 1/2008 | Wang et al. |
| 2009/0060258 A1 | | 3/2009 | Wang et al. |
| 2009/0060261 A1 | | 3/2009 | Wang |

OTHER PUBLICATIONS

U.S. Appl. No. 11/897,772—An Unofficial Prosecution History Between Mar. 17, 2011 and Sep. 1, 2011 for U.S. Appl. No. 11/897,772, filed Aug. 31, 2007, Published Mar. 5, 2009, as US-2009-0060261-A1; Inventor: Shen-ge Wang.
An unofficial prosecution history as of Mar. 17, 2011 for U.S. Appl. No. 11/897,772; published Mar. 5, 2009 as US-2009-0060261-A1; Inventor Shen-ge Wang.
An unofficial prosecution history as of Mar. 17, 2011 for US Patent 7894626 issued Feb. 22, 2011; U.S. Appl. No. 11/848,908; published Mar. 5, 2009 as US-2009-0060258-A1; Inventor Shen-ge Wang.

* cited by examiner

*Primary Examiner* — Abolfazl Tabatabai
(74) *Attorney, Agent, or Firm* — Duane C. Basch; Basch & Nickerson LLP

(57) ABSTRACT

Disclosed are systems and methods directed to the generation of multi-layer digital watermarks, including the generation of distinct watermarks on each of at least two color layers or channels within an image such that each may be retrieved or viewed independently of the other in the output image.

17 Claims, 9 Drawing Sheets
(3 of 9 Drawing Sheet(s) Filed in Color)

SYSTEM AND METHOD FOR THE GENERATION OF MULTI-LAYER CORRELATION-BASED DIGITAL WATERMARKS

CROSS-REFERENCE TO COPENDING APPLICATIONS

Attention is directed to the co-pending applications by S. Wang filed concurrently herewith: U.S. application Ser. No. 11/897,772, filed Aug. 31, 2007 (US-2009/0060261), entitled "SYSTEM AND METHOD FOR THE GENERATION OF CORRELATION-BASED DIGITAL WATERMARKS;" and U.S. application Ser. No. 11/848,908, filed Aug. 31, 2007 (US 2009/0060258, and U.S. Pat. No. 7,894,626), entitled "SYSTEM AND METHOD FOR THE GENERATION OF MULTIPLE ANGLE CORRELATION-BASED DIGITAL WATERMARKS," and the disclosure found in these co-pending applications is hereby incorporated by reference in its entirety. The systems and processes of the above-identified and co-pending applications may be selected for their teaching and support of the present application and various embodiments thereof.

Disclosed in embodiments herein are methods and systems for generation of multi-layer digital watermarks, and more particularly, the generation of different watermarks on each of at least two color layers or channels such that each may be retrieved or viewed independently of the other.

BACKGROUND AND SUMMARY

Prior patents, such as U.S. Pat. No. 6,252,971 for "Digital watermarking using phase-shift stoclustic screens," by S. Wang, hereby incorporated by reference in its entirety, describe a method to embed correlation-based phase-shift digital watermarks into halftone screens. By overlaying a transparency on the prints generated by the special halftone screen, for example as a public key, invisible watermarks can be retrieved. For color images, the watermark was embedded into all or a selected color channel in a dot-on-dot arrangement.

The present disclosure characterizes an improved system and method whereby different correlation-marks are embedded into different color channels, or layers. Therefore, watermarks are embedded and retrieved in multiple layers. This modification enables the use of the digital watermarking process to create a greater number of encoded images within a single image. In one embodiment, the different colors are printed at rotated angles, which further provide moiré-free halftone outputs and avoids the color instability arising from a dot-on-dot rendering approach. The overlay-transparencies, or the public keys, to retrieve the correlation-marks for different colors can be different in frequencies and/or angles, so different users with different keys can read different messages from the same printed output image.

One example is a case where three color channels (cyan, magenta, black) are halftoned with the same frequency amplitude but different angles, so the same public key, manifested for example in a transparency printed with a selected halftone screen pattern, can be used to view or retrieve different watermarks embedded in different colors with varying rotations/orientations of the transparency. The present disclosure provides potential applications of digital watermarking to digital imaging methods and products.

Disclosed in embodiments herein is a method for digital watermarking of a multi-color image, comprising: receiving the image to be watermarked; determining the watermarks to be embedded in the image; embedding a plurality of invisible digital watermarks into the image, wherein a first watermark is embedded into a first color layer and a second watermark is embedded into a second color layer; and outputting the watermarked image containing the embedded invisible digital watermarks, wherein at least two of the color layers in the image include invisible digital watermarks therein.

Further disclosed in embodiments herein is a method for digital watermarking of a multi-color image, comprising: receiving the image to be watermarked; determining a first watermark, a second watermark and optionally a third watermark to be embedded in the image; embedding the first, second and third watermarks into the image, wherein the first watermark is embedded into a first color layer, the second watermark is embedded into a second color layer and the optional third watermark is embedded into a third color layer; and outputting the watermarked image containing the embedded invisible digital watermarks, wherein the image include invisible digital watermarks in at least three of the color layers therein.

Also disclosed in embodiments herein is a system for digital watermarking of a multi-color image, comprising: an input image source; image memory for storing the input image to be watermarked; watermark memory for storing the watermarks to be embedded in the image; and an image processor for embedding a plurality of invisible digital watermarks into the image, wherein a first watermark is embedded into a first color layer and a second watermark is embedded into a second color layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7A depicts an exemplary output image (black/white) having a watermark embedded whereas

The various embodiments described herein are not intended to limit the invention to those embodiments described. On the contrary, the intent is to cover all alternatives, modifications, and equivalents as may be included within the spirit and scope defined by the appended claims.

DETAILED DESCRIPTION

As more particularly set forth below, the disclosed system and methods are directed to the generation of multi-layer digital watermarks, including the generation of distinct watermarks on each of at least two color layers or channels within an image such that each may be retrieved or viewed independently of the other in the output image.

Figure 1A:
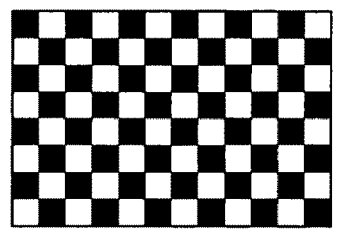
FIGS. 1A and 1B are exemplary representations of halftone patterns and FIGS. 1C-1D illustrate the effect achieved by overlaying the patterns of FIGS. 1A and 1B.
Figure 1B:
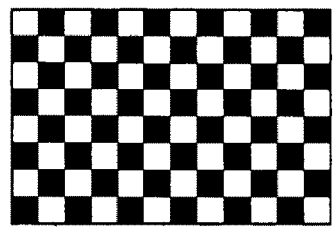
Figure 1C:
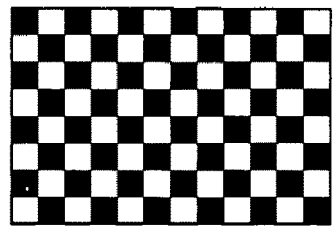
Figure 1D:

The basics of phase-shift based digital watermarks, or correlation-marks, are described in U.S. Pat. No. 6,252,971 for "Digital watermarking using phase-shift stoclustic screens," by S. Wang, previously incorporated herein by reference. Briefly, if two similar cluster halftone patterns are superimposed on each other, the output appearances can differ significantly depending on the relative positions, or the phase shift, of the two patterns. For example, the two checkerboard patterns depicted in FIGS. 1A and 1B are essentially the same, except that the pattern in FIG. 1B is a shifted version of FIG. 1A with an exactly "one-box width" shift. If the two patterns of FIGS. 1A and 1B, are superimposed on each other with a perfect alignment, the result, shown as A&B, would be a complete black as depicted in FIG. 1D. On the other hand, overlapping of A with A itself, which can be considered a version of A with a zero-shift, should be identical to the original pattern A, and the result is depicted in FIG. 1C.

Figure 2A:
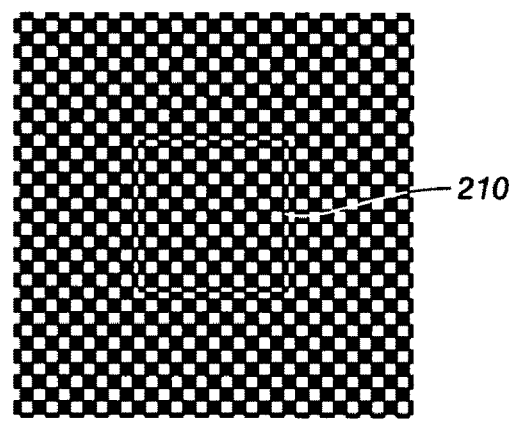
FIGS. 2A-C are exemplary representations of an aspect of embodiments disclosed showing the phase shifting of only a portion of a halftone image.
Figure 2B:
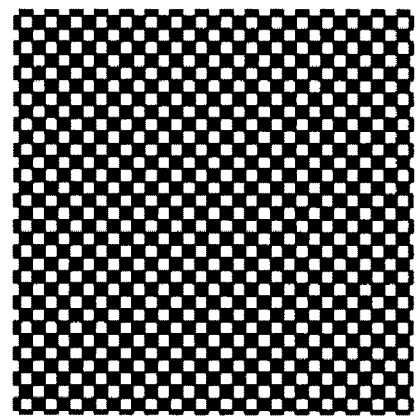
Figure 2C:
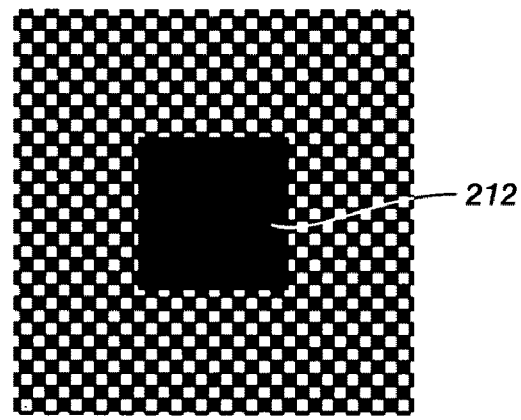

Turning next to FIGS. 2A-2C, there are depicted exemplary representations of an aspect of the embodiments. For example, it is possible to shift only a portion of the halftone pattern, e.g., the central portion or region 210. The desired overlay effect with a reference, or a "public key", represented by the FIG. 2B, is illustrated by the result in FIG. 2C.

The example depicted in FIGS. 2A-2C is a simple demonstration for the phase-shift watermark technique. The shifted central part 210 in the picture may be considered as a square watermark, which is retrieved as a black square 212 in the overlay of FIG. 2C. The shift required for an optimal retrieval is equal to a half period of the halftone structure, or $\pi$, in a general mathematic term. The problem with a simple "insertion" is that the boundaries between the shifted portion and the balance of the image are quite visible in FIG. 2B. To hide the seam, the phase jump from zero to $\pi$ should be replaced by a smooth phase transition.

In U.S. Pat. No. 6,252,971 to S. Wang, the phase transition was achieved differently depending on the different geometries of the phase jump. Twelve basic transition "tiles" were categorized as left-to-right, right-to-left, top-down, bottom-up, and upper-left inner corner, upper-left outer corner, etc. To embed a watermark pattern into halftone images, a large stoclustic (stochastically clustered) halftone screen was created by a tiling process, which combined different transition tiles together. One improvement found in the disclosed system and methods is that smaller watermark patterns may be embedded, whereas the tiling process required a larger (multiple tile) stoclustic halftone screen.

Figure 3A:
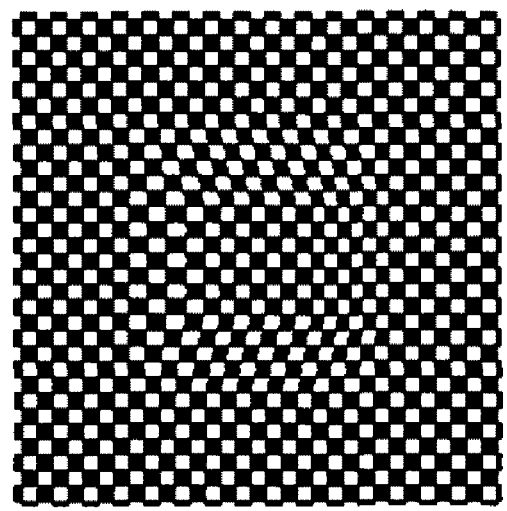
FIGS. 3A-B are representative examples of images processed in accordance with an aspect of the disclosed embodiments.
Figure 3B:
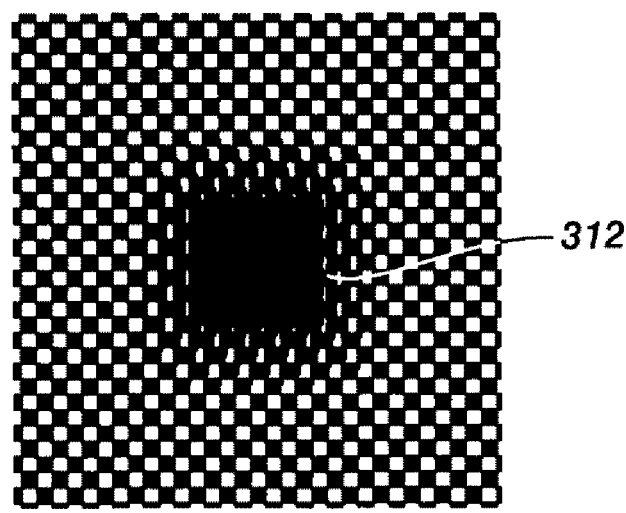

As an example of the advantages of the disclosed embodiments, considering the region 210 in the example in FIGS. 2A-C above as a desired watermark, with the phase transition, the halftone output with the watermark pattern embedded looks like FIG. 3A, where the watermark boundary about the central region is much less visible than in FIG. 2A. When a reference key such as FIG. 2B is placed atop the halftone pattern of FIG. 3A, a somewhat blurred square such as depicted in region 312 in FIG. 3B will be retrieved as the watermark.

Figure 4:
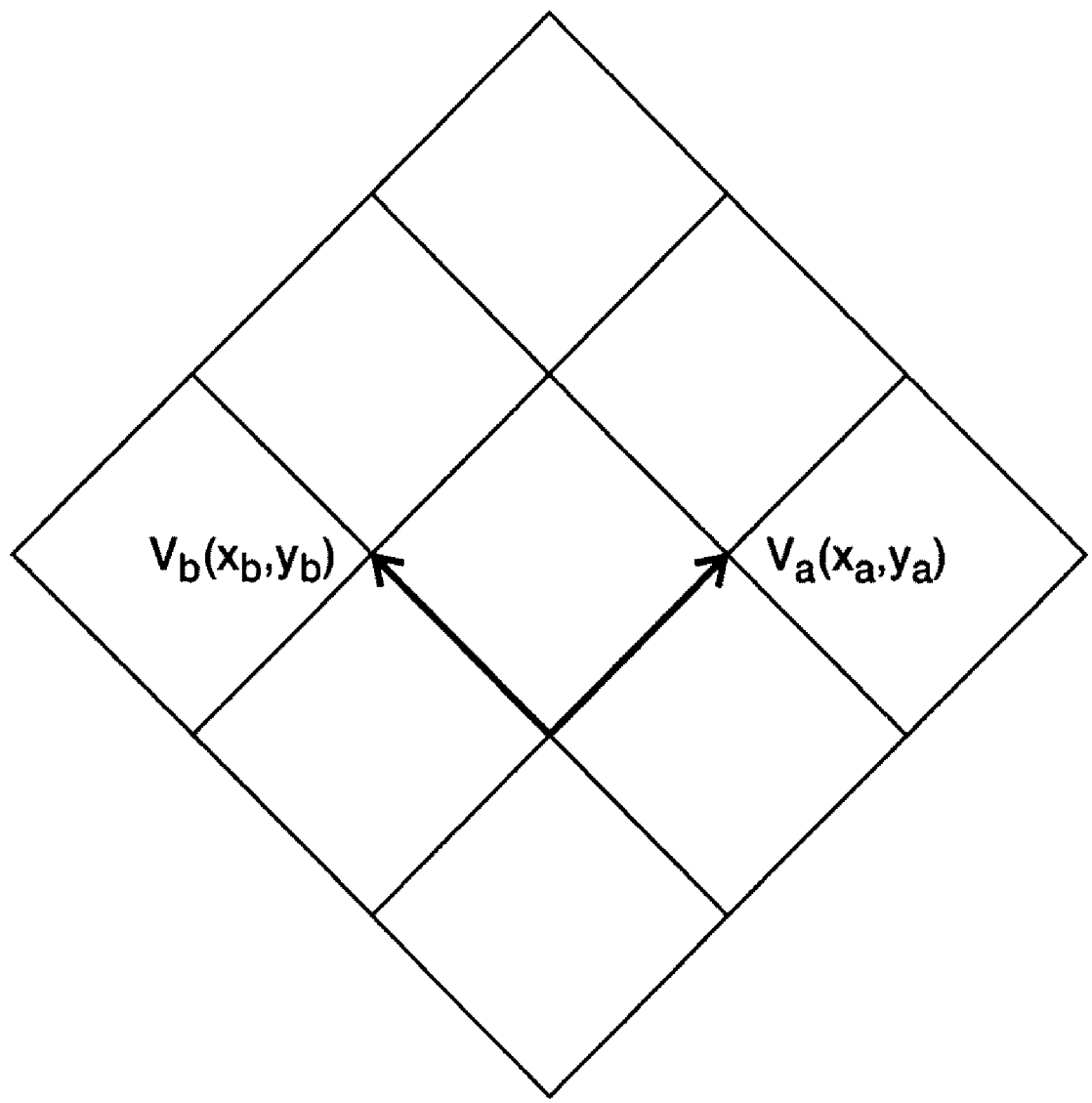
FIG. 4 is a vectorized representation of the geometry of a cluster screen used in accordance with the disclosed system and method.

Using a vector notation, the geometry of a cluster screen can be specified by two spatial vectors, $V_a(x_a, y_a)$ and $V_b(x_b, y_b)$, as shown in FIG. 4. As an example, a 45-degree, 106 line-per-inch (LPI) cluster screen for a 600 dot-per-inch (DPI) printer can be represented by two vectors, $V_a(4, 4)$ and $V_b(-4, 4)$.

For halftoning images specified by 8 bits, or gray levels between 0 to 255, a common design of the two-dimensional threshold array with a given cluster geometry can be described mathematically as $$T(x,y)=128-127\cdot\{\cos[k\pi(x\cdot y_a+y\cdot x_a)]+\cos[k\pi(x\cdot y_b+y\cdot x_b)]\}/2, \quad (1)$$

where k is a scaling factor constant.

The equation, sometimes referred to as the dot profile, provides round-dot or round-hole shapes for the halftone outputs in the highlight or the shadow part of an image, and checkerboard-like patterns for the middle tones. This halftone appearance is also close to that achieved by traditional off-set printing technologies and adapted by many digital halftoning methods; for example U.S. Pat. No. 4,149,183 to R. J. Pellar et al and U.S. Pat. No. 4,196,451 to R. J. Pellar. The dot profile T(x, y) in Equation 1 is used as the initial zero-shift halftone screen, or T(x, y, 0). The three-dimensional threshold array, which is also a function of the phase shift used for watermark embedding, can be obtained by using a slight modification of Equation 1, and expressed as $$T(x,y)=128-127\cdot\{\cos[k\pi(x\cdot y_a+y\cdot x_a)+s]+\cos[k\pi(x\cdot y_b+y\cdot x_b)+s]\}/2, \quad (2)$$

where s is the phase shift in radians.

The resolution of the phase shift depends on the application. In general, a higher resolution provides better watermark hiding but requires larger memory space to store the three-dimensional array. Practically, for most applications it is possible choose N, the number of steps for a linear phase transition from zero to $\pi$, equal to 255. Therefore, it is possible to interpret the gray-levels in terms of desired phase shift. To embed a black/white watermark into halftone images, a $\pi$ shift for all the black areas and no shift for the white background is needed. Consider using 0 for the white and 255 for a complete black, we may interpret the white, or the gray level 0, as a zero phase shift and the complete black, or the gray level 255, as a $\pi$ phase shift. In other words, $$s=g\cdot\pi/N, \quad (3)$$

where g is the gray level, N=255 is the total number of gray levels and s is the phase shift. As will be appreciated, a smooth phase transition may be necessary to hide seams caused by the imposition of the watermark image.

Figure 5A:
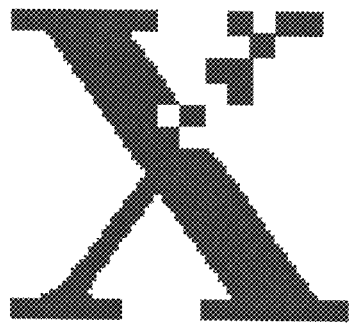
FIGS. 5A and 5B are representative illustrations of watermark images.
Figure 5B:

Referring to FIGS. 5A and 5B, the desired phase transition can be represented by a blurred image, such as shown in FIG. 5B, which may be produced from the original bi-level watermark in FIG. 5A, wherein all gray levels between 0 and 255 in the blurred image can be interpreted as intermediate steps between phase zero and phase $\pi$. The blurring process may be conducted using well-known low-pass filtering methods. The proper low-pass filters used in the process can be determined in practice by balancing the watermark hiding effect and the contrast of retrieved watermarks. Experimental results suggest that the area of the low-pass filter should be large enough to cover a plurality of clusters, more particularly at least about ten clusters, to provide a satisfactory result.

Watermark Embedded Halftoning

Figure 6:
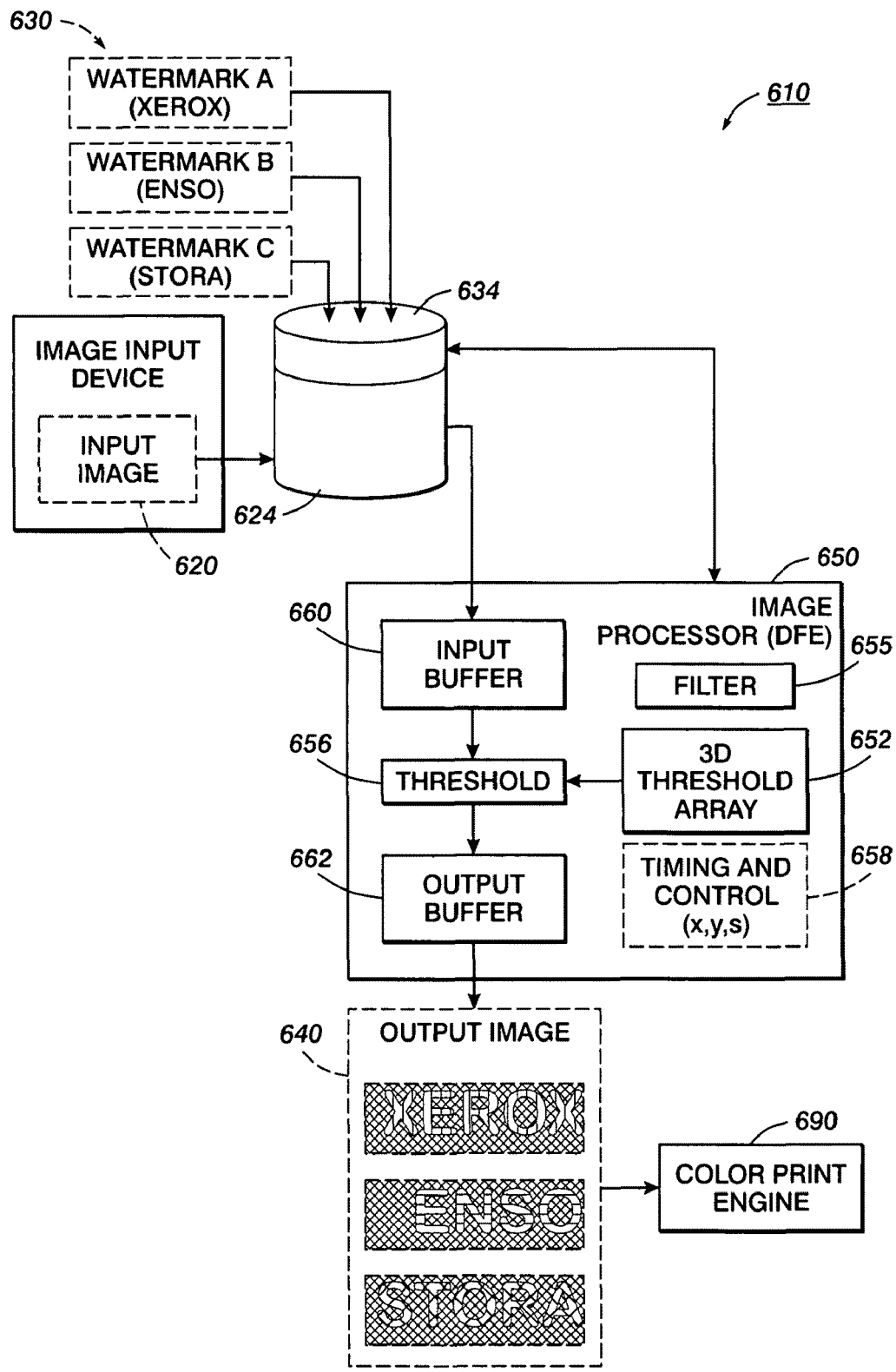
FIG. 6 is a block diagram depicting an embodiment of the system and related methods described herein.

Briefly, the watermark embedding process can be summarized as the series of steps generally illustrated in accordance with the block diagram of FIG. 6. FIG. 6 is an exemplary color image processing system 610, suitable for carrying on digital watermarking of a multi-color input image. The system 610 includes an image input device, as a source of an input image 620, such as a scanning device, a computer or image workstation for generating images, or a digital camera. The digital input image is at least temporarily or partially stored in an image memory 624. Memory 624, although depicted as a hard disk, may be any suitable media or installed circuitry including RAM and ROM, removable and permanent and various combinations thereof as are commonly known and used for the storage of digital data such as images. As will be further appreciated the memory 624 may be employed merely as a buffer just for the temporary storage of a portion of the image during processing as described herein.

Similarly, a watermark memory 634 is employed for storing at least two watermarks 630 to be embedded in the color layers of an output image to be created from the stored input image. System 610 further includes an image processor 650 or similar control and processing circuitry, such as a digital front end (DFE) known for use in the processing of digital images for rendering on color printing engines and reprographic devices (e.g., Xerox® iGen3™, DocuColor™ and WorkCentre™ systems, etc.). The processor is employed for embedding at least two invisible digital watermarks 630 into the output image 640, wherein the first watermark is embedded into a first color layer and a second watermark is embedded into a second color layer. As will be appreciated the output image 640 may be rendered on any color image output device such as a suitable marking or printing engine 690 capable of rendering color output on one or more media.

First, system 610 generates a three-dimensional (3D) threshold array 652 as described in the alternative embodiments above, and stores the result into a memory. Alternatively, the threshold values for a plurality of given x, y and s values can also be calculated pixel-wise during the embedding process using Equation 2 above. Storing the pre-calculated result into the processor memory, in 3D threshold array 652 is intended for speeding up the halftone process. Accordingly, it will be appreciated that various halftone result generation and storage techniques may be employed in alternative embodiments. Such techniques include, for example, image processing algorithms implemented in accordance with the equations set forth herein to produce the shifted watermark image, as well as off-the-shelf or custom-designed integrated circuitry (chips) or the like. The three-dimensional (3D) threshold array may have a particular advantage in one embodiment (e.g., speed) whereas alternative methods for accomplishing the same function may be particularly applicable in alternative embodiments (e.g., reduced memory size). Although not specifically depicted, it will be appreciated that the method described is repeated to all color layers in which watermarks are embedded, and that each color has an individual three-dimensional threshold array.

Next, for a given watermark pattern 630, a low-pass filter 655 may be applied to smooth out edges of the watermark image and the resultant image is then stored in memory as a multi-bit gray image (e.g., 8-bit), where the different gray levels represent different phase shifts for watermark embedding. If the original watermark pattern does not contain any high-frequency details, it is unlikely that the watermark will be detected when embedded into the output image and this step may be omitted. The input image 620 and the processed watermark image(s) obtained previously are then read in by the image processor and a pixel-wise halftoning operation is conducted. In accordance with the disclosed embodiments, the three-dimensional threshold array 652, stored in memory accessible to the processor 650, is employed as an input to a threshold operation 656. In response to location coordinates x and y, the input value from the input image, and the threshold value determined by the coordinates x, y, and the phase shift s given by Equation 3, a resulting gray level g is determined for a plurality of coordinate locations to produce the processed watermark image 640.

As will be appreciated by those familiar with the design of image processing systems, the image processor 650 further includes timing and control operation block 658, which controls the flow of data and processing operations within the image processor, including any buffering of the image data as depicted in buffers 660 and 662. A wide variety of hardware may be employed to achieve the functionality depicted with regard to the image processor, including dedicated image processing chipsets and conventional computer workstations, as well as combinations thereof or other processing devices. Moreover, as noted above, the method is repeated for all color layers in which watermarks are embedded, which may be accomplished in series or parallel, depending upon the nature of the processing system.

Once processed, the invisible digital watermark(s) is embedded into the output image 640 (shown as three "color" layers or separations), wherein separate watermarks are embedded into each color of the multi-layer output. The watermarked image containing the embedded invisible digital watermarks, is then provided as input to a color printing engine for rendering, wherein at least two of the color layers in the image include invisible digital watermarks therein.

Figure 7A:
Figure 7B:
FIG. 7B depicts the retrieved correlation mark within the image.

An example of halftone images with invisible digital watermarks embedded using the disclosed system and method is shown in FIGS. 7A-B and 7. In FIG. 7A a black/white halftone image is depicted with an embedded watermark (representing what would be seen in a color watermarked image) and in FIG. 7B the retrieved correlation mark is illustrated (again representing what would be seen in a color watermarked image). The public key used in the watermark retrieval may be a standard checkerboard pattern matching the halftone screen used for embedding.

It is further believed that the disclosed embedding method(s) provide a solution to embed any watermark pattern represented by 8-bit gray images. Although high frequency details of the watermarks may not be shown upon retrieval, the trade-off between watermark capacity and the hiding effect is well under control. The input image and the watermark image are independent until conducting the halftoning process, thus, a run-time embedding feature for variable-data watermarks can be quickly added into most printing systems.

Figure 8:
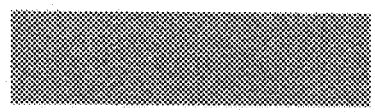
FIG. 8 is an exemplary output image (color) having a plurality of watermarks embedded in different color planes.
Figure 10A:
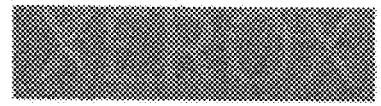
FIGS. 10A-C are illustrative examples of the resultant retrieval of the marks embedded in FIG. 8.
Figure 10B:
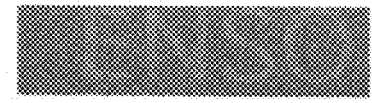
Figure 10C:
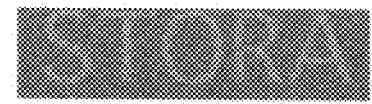

As will be further appreciated, the disclosed methods can be readily extended in their application to color halftoning, even where different channels use different rotated screens—in which cases Equation 2 should be applied with different $V_a$ and $V_b$ for corresponding channels (colors). As an example, a color halftone image with an embedded image is depicted in FIG. 8 and the retrieved watermark(s) are shown in FIGS. 10A-C.

It is further conceived that a more elaborate pattern may be employed as the public key in order to make detection of the embedded watermark even more difficult. Of course, the public key information must also correlate with the watermark embedding process. It will also be appreciated that embodiments of the system and method may include retrieving watermarks from images that have a watermark embedded as described above. One example of a method for retrieving watermarks is also disclosed in U.S. Pat. No. 6,252,971 for "Digital Watermarking Using Phase-Shifted Stoclustic Screens," by S. Wang, issued Jun. 26, 2001, which is hereby incorporated by reference in its entirety.

With existing correlation-mark technology, the same watermarks may be embedded in all color channels using a dot-on-dot screening method, where the same halftone frequency and angle are used for each color. As disclosed in yet another embodiment herein different halftone structures are employed for different color channels or layers and different watermarks may thereby be embedded into the different channels or layers. To avoid moiré patterns in the output image, especially those due to overlapping cyan, magenta and black, the rotated halftone screens of different colors have to meet certain requirements. The details of the general moiré-free conditions for multi-color halftone screening can be found, for example, in U.S. Pat. No. 6,798,539 for "Method for Moire-Free Color Halftoning Using Non-Orthogonal Cluster Screens," by S. Wang et al., issued Sep. 28, 2004, which is hereby incorporated by reference in its entirety.

The three screens for C, M and K can be different in frequency amplitudes and/or angles. It will be appreciated by those knowledgeable in the printing arts that the use of yellow (Y) for embedding of watermarks may be less desirable due to the nature of the colorant and difficulty in perception when intermixed with other colorants—yellow generally being the least perceptible of the cyan, magenta, yellow and black colorants typically employed. Although the described relative to cyan, magenta and black, it is possible to utilize alternative sets of colors (or color channels) for the system and method described. Using the spatial vectors $V_a(x_a, y_a)$ and $V_b(x_b, y_b)$, set forth in Equation 1 previously, to specify the halftone frequencies, the basic three-color moiré-free condition may be defined as:

$$v_{aC} + v_{aM} + v_{aK} = 0;$$

$$v_{bC} + v_{bM} + v_{bK} = 0. \quad (4, 5)$$

The classic solution of the above condition is to use three rotated halftone screens with the same frequency amplitude but different rotation angles, for example, separated by 30 degrees. In such an embodiment, two or three different watermark patterns can be independently embedded into two or three different color channels using the method described. As a demonstration of the embodiments described, the following text segments were employed for three independent watermark patterns for cyan, magenta and black channels, respectively "XEROX," "ENSO" and "STORA."

Figure 9:
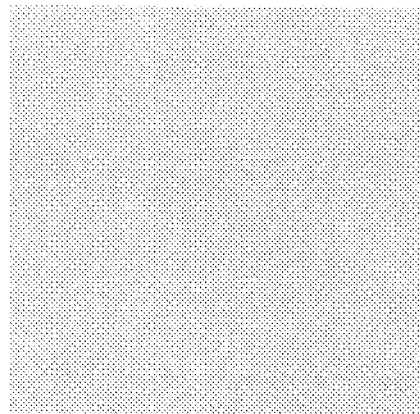
FIG. 9 is an example of a public key screen that may be used to detect the watermarks in the image of FIG. 8.

A 106 line-per-inch (LPI) cluster screen was employed with rotation angles of 40 degrees for cyan, 70 degrees for magenta, and 10 degrees for black. The halftone output with all three layers (C, M, K) is shown in FIG. 8. When a public key (e.g., FIG. 9) is printed, for example as a transparency, and is placed over the image of FIG. 8 and rotated to about 40, 70, or 10 degrees, the watermark retrievals may be observed similar to the digital simulations depicted in FIGS. 10A-10C, respectively.

As noted above, various embodiments of the system and method for the generation of multi-layer correlation-based digital watermarks may use a single public key for all three channels with proper angle alignments. As alternatives, for other applications, it is possible to use different keys with different halftone frequencies, so that different users could read different watermark messages depending on their respective or selected keys. In other words, different messages may be embedded within a common image or printed document, whereby the retrieval is dependent upon the public key characteristics—enabling the retrieval of information embedded within a single color channel.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for digital watermarking of a multi-color image, comprising:
    receiving the image to be watermarked;
    determining the watermarks to be embedded in the image;
    embedding a plurality of invisible digital watermarks into the image, wherein a first watermark is embedded into a first color layer and a second watermark is embedded into a second color layer; wherein embedding a plurality of invisible digital watermarks, further comprises
    for each color layer in which watermarks are embedded, generating a multi-dimensional threshold array, and
    using the multi-dimensional threshold array, pixel-wise halftoning the image to embed the watermarks therein, and
    outputting the watermarked image containing the embedded invisible digital watermarks, wherein at least two of the color layers in the image include invisible digital watermarks therein.

2. The method according to claim 1, wherein pixel-wise halftoning further comprises applying a phase-shift transition.

3. The method according to claim 2, wherein applying a phase-shift transition further comprises, for a given location with coordinates x and y, choosing an input value from the image and a threshold value determined by the coordinates x and y, for a phase shift s, and where the resultant gray level g is read from the processed watermark image.

4. The method according to claim 1, further comprising applying a low-pass filter to the image before embedding the watermark.

5. The method according to claim 4, wherein halftones for each of said first and second watermarks are distinguished from one another by a shift in an angle between the respective color channels.

6. The method according to claim 5, wherein the shift in the angle is between about 5 degrees and about 45 degrees.

7. The method according to claim 5, wherein the shift in the angle is 30 degrees.

8. The method according to claim 4, wherein halftones for each of said first and second watermarks are distinguished from one another by a shift in frequency between the respective color channels.

9. The method according to claim 1, wherein generating a multi-dimensional threshold array includes storing the resultant array data in a memory.

10. A method for digital watermarking of a multi-color image, comprising:
    receiving the image to be watermarked;
    determining a first watermark, a second watermark and a third watermark to be embedded in the image;
    embedding the first, second and third watermarks into the image, wherein the first watermark is embedded into a first color layer, the second watermark is embedded into a second color layer and the third watermark is embedded into a third color layer; and
    outputting the watermarked image containing the embedded invisible digital watermarks, wherein the image includes invisible digital watermarks in at least three of the color layers therein and where embedding a plurality of invisible digital watermarks, further comprises
    for each color layer, in which watermarks are embedded, generating a multi-dimensional threshold array, and
    using the multi-dimensional threshold array, pixel-wise halftoning the image to embed each of the watermarks therein.

11. The method according to claim 10, wherein pixel-wise halftoning further comprises applying a phase-shift transition.

12. The method according to claim 11, wherein applying a phase-shift transition further comprises, for a given location with coordinates x and y, choosing an input value from the image and a threshold value determined by the coordinates x and y, for a phase shift s, and where the resultant gray level g is read from the processed watermark image.

13. The method according to claim 10, further comprising applying a low-pass filter to the image before embedding the watermark.

14. The method according to claim 10, wherein halftones for each of said first, second and third watermarks are distinguished from one another by a shift in an angle between the respective color channels.

15. A system for digital watermarking of a multi-color image, comprising:
   an input image source;
   image memory for storing the input image to be watermarked;
   watermark memory for storing the watermarks to be embedded in the image;
   an image processor for embedding a plurality of invisible digital watermarks into the image, wherein a first watermark is embedded into a first color layer and a second watermark is embedded into a second color layer;
   a low-pass filter, operating in conjunction with said image processor, to smooth edges of the input image prior to embedding of a watermark; and
   a multi-dimensional threshold array operatively associated with said image processor to provide varying and independent thresholds for each of a plurality of color layers based upon a variable.

16. The system of claim 15, wherein said variable is a shift in the angle between respective color layers.

17. The system of claim 15, wherein said variable is a change in the frequency of a screen applied between respective color layers.

* * * * *